United States Patent [19]
Sato

[11] Patent Number: 6,072,906
[45] Date of Patent: Jun. 6, 2000

[54] IMAGE DATA PROCESSING APPARATUS

[75] Inventor: Hiroaki Sato, Yokohama, Japan

[73] Assignee: Canon Kabushiki Kaisha, Tokyo, Japan

[21] Appl. No.: 08/901,562

[22] Filed: Jul. 28, 1997

Related U.S. Application Data

[60] Continuation of application No. 08/514,002, Aug. 11, 1995, which is a division of application No. 08/264,249, Jun. 22, 1994, Pat. No. 5,461,681, which is a continuation of application No. 08/075,347, Jun. 14, 1993, which is a continuation of application No. 07/766,218, Sep. 27, 1991, which is a division of application No. 07/550,224, Jul. 9, 1990, Pat. No. 5,073,966, which is a continuation of application No. 07/338,333, Apr. 13, 1989, which is a continuation of application No. 07/031,210, Mar. 30, 1987, which is a continuation of application No. 06/605,670, Apr. 30, 1984.

[30] Foreign Application Priority Data

May 10, 1983 [JP] Japan .................................. 58-080085

[51] Int. Cl.[7] ...................................................... G06K 9/36
[52] U.S. Cl. ............................ 382/237; 358/429; 358/456
[58] Field of Search .................................... 382/232, 304, 382/305, 237; 358/246, 456, 429, 426, 261.2, 261.3; 348/411, 348

[56] References Cited

U.S. PATENT DOCUMENTS

| 4,441,208 | 4/1984 | Iida .............................................. 382/56 |
|-----------|--------|-----------------------------------------------------------|
| 4,496,989 | 1/1985 | Hirosawa .................................. 358/296 |
| 4,566,127 | 1/1986 | Sekiya et al. ............................... 382/56 |
| 4,628,366 | 12/1986 | Yamada .................................... 358/280 |
| 4,665,555 | 5/1987 | Alker et al. ................................ 382/41 |
| 4,672,679 | 6/1987 | Freeman .................................... 382/56 |
| 4,727,589 | 2/1988 | Hirose et al. ............................... 382/56 |
| 5,038,389 | 8/1991 | Nizuno ....................................... 382/56 |

*Primary Examiner*—Joseph Mancuso
*Attorney, Agent, or Firm*—Fitzpatrick, Cella, Harper & Scinto

[57] ABSTRACT

An image data processing apparatus comprises output means for outputting an image data for each pixel and compression means for compressing the image data supplied from the output means to an image data of a predetermined number of bits. The compression means compresses the image data in accordance with a dot pattern having a predetermined number of tone levels.

8 Claims, 8 Drawing Sheets

| INPUT PIX DATA a | CO-ORDINATES X,Y (2x2 AS ONE UNIT) | OUTPUT DOT PATTERN b |
|---|---|---|
| 1 1 0 | 1 , 1 |  |
|  | 1 , 2 |  |
|  | 2 , 1 |  |
|  | 2 , 2 |  |

FIG. 6A

| CO-ORDI-NATES X.Y | INPUT PIX DATA a | OUTPUT CODE DATA c |
|---|---|---|
| 1 , 1 | 0 ~ 38 | 0 |
| | 39 ~ 46 | 1 |
| | 47 ~ 102 | 2 |
| | 103 ~ 110 | 3 |
| | 111 ~ 134 | 4 |
| | 135 ~ 142 | 5 |
| | 143 ~ 230 | 6 |
| | 231 ~ 238 | 7 |
| | 239 ~ 255 | 8 |

| CO-ORDI-NATES X,Y | INPUT PIX DATA a | OUTPUT CODE DATA c | CO-ORDI-NATES X,Y | INPUT PIX DATA a | OUTPUT CODE DATA c |
|---|---|---|---|---|---|
| 1,1 | 0 ~ 38 | 0 | 2,1 | 0 ~ 6 | 0 |
|  | 39 ~ 46 | 1 |  | 7 ~ 14 | 1 |
|  | 47 ~ 102 | 2 |  | 15 ~ 70 | 2 |
|  | 103 ~ 110 | 3 |  | 71 ~ 78 | 3 |
|  | 111 ~ 134 | 4 |  | 79 ~ 166 | 4 |
|  | 135 ~ 142 | 5 |  | 167 ~ 174 | 5 |
|  | 143 ~ 230 | 6 |  | 175 ~ 198 | 6 |
|  | 231 ~ 238 | 7 |  | 199 ~ 206 | 7 |
|  | 239 ~ 255 | 8 |  | 207 ~ 255 | 8 |
| 1,2 | 0 ~ 54 | 0 | 2,2 | 0 ~ 22 | 0 |
|  | 55 ~ 62 | 1 |  | 23 ~ 30 | 1 |
|  | 63 ~ 86 | 2 |  | 31 ~ 118 | 2 |
|  | 87 ~ 94 | 3 |  | 119 ~ 126 | 3 |
|  | 95 ~ 182 | 4 |  | 127 ~ 150 | 4 |
|  | 183 ~ 190 | 5 |  | 151 ~ 156 | 5 |
|  | 191 ~ 214 | 6 |  | 159 ~ 246 | 6 |
|  | 215 ~ 222 | 7 |  | 247 ~ 254 | 7 |
|  | 223 ~ 255 | 8 |  | 255 | 8 |

FIG. 7B

| CO-ORDI-NATES X,Y | OUTPUT CODE DATA c | OUTPUT DOT PATTERN a' | CO-ORDI-NATES X,Y | OUTPUT CODE DATA c | OUTPUT DOTE PATTERN a' |
|---|---|---|---|---|---|
| 1,1 | 0 | 19 | 2,1 | 0 | 3 |
|  | 1 | 42 |  | 1 | 10 |
|  | 2 | 74 |  | 2 | 42 |
|  | 3 | 106 |  | 3 | 74 |
|  | 4 | 122 |  | 4 | 122 |
|  | 5 | 138 |  | 5 | 170 |
|  | 6 | 186 |  | 6 | 186 |
|  | 7 | 234 |  | 7 | 202 |
|  | 8 | 247 |  | 8 | 231 |
| 1,2 | 0 | 27 | 2,2 | 0 | 11 |
|  | 1 | 58 |  | 1 | 26 |
|  | 2 | 74 |  | 2 | 74 |
|  | 3 | 90 |  | 3 | 122 |
|  | 4 | 138 |  | 4 | 138 |
|  | 5 | 186 |  | 5 | 154 |
|  | 6 | 202 |  | 6 | 202 |
|  | 7 | 218 |  | 7 | 250 |
|  | 8 | 239 |  | 8 | 255 |

IMAGE DATA PROCESSING APPARATUS

This application is a continuation of application Ser. No. 08/514,002 filed on Aug. 11, 1995, which is a divisional of application Ser. No. 08/264,249 filed on Jun. 22, 1994, now U.S. Pat. No. 5,461,681 a continuation of prior application Ser. No. 08/075,347 filed on Jun. 14, 1993 which is a continuation of prior application Ser. No. 07/766,218 filed on Sep. 27, 1991 which is a division of prior application Ser. No. 07/550,224 filed on Jul. 9, 1990 now U.S. Pat. No. 5,073,966 which is a continuation of prior application Ser. No. 07/338,333 filed on Apr. 13, 1989 which is a continuation of prior application Ser. No. 07/031,210 filed on Mar. 30, 1987 which is a continuation of prior application Ser. No. 06/605,670 filed on Apr. 30, 1984.

BACKGROUND OF THE INVENTION

1. Field of the Invention

The present invention relates to an image data processing apparatus which processes an input image data sampled for each pixel.

2. Description of the Prior Art

An image processing apparatus which uses an image processing system called a dither method in which an input image data for each pixel is processed by one element of a threshold matrix (dither matrix) to convert it to one-bit or multi-bit data representing a binary or multi-value dot, has been known. An image processing apparatus which uses an image processing system called a density pattern method in which an input image data for each pixel is processed by an entire threshold matrix to produce a dot pattern representing the input data, has also been known.

In the image processing apparatus which uses the density pattern method, the input 6 to 8-bit pixel data is transmitted to an output device such as a printer and it is converted to a dot pattern in the output device, or the input pixel data is stored in a memory and then it is converted to the dot pattern in the output device.

Accordingly, in such image processing device, the input pixel data must be transmitted or stored as it is in spite of the fact that the number of tone levels in the output device is smaller than that of the input pixel data.

SUMMARY OF THE INVENTION

It is an object of the present invention to provide an image data processing apparatus which can represent an image data by a smaller number of bits than the number of bits of an input image data and store or transmit it.

It is another object of the present invention to provide an image data processing apparatus which can reproduce a high quality image.

It is other object of the present invention to provide an image data processing apparatus which comprises an input image data such that an image can be moved while it is compressed.

It is other object of the present invention to provide an image data processing apparatus which can reproduce a high quality of image for different output devices.

It is a further object of the present invention to provide an image data processing apparatus which encodes an image data in accordance with the number of output tone levels.

DETAILED DESCRIPTION OF THE PREFERRED EMBODIMENTS

Figure 1:
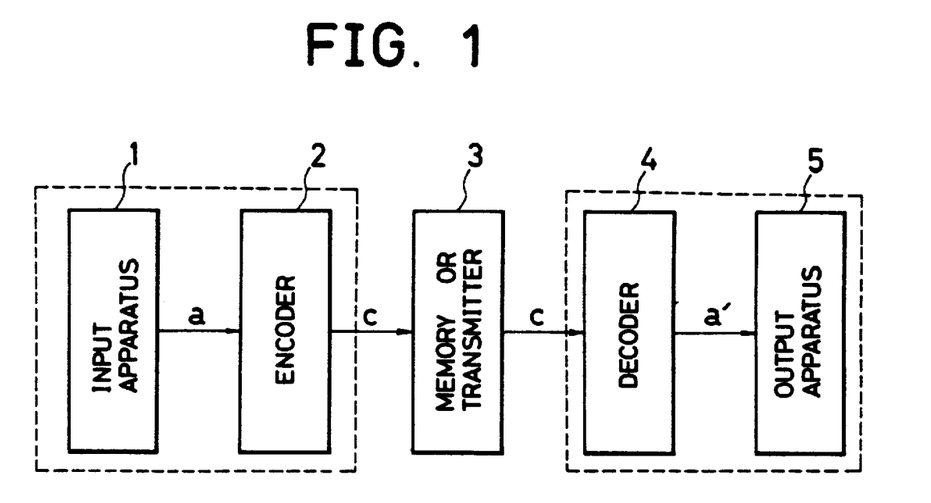
FIG. 1 is a block diagram showing a configuration of an image input (output system to which an image data processing apparatus of the present invention is applied, FIG. 2 is a block diagram showing a configuration of an encoder 2 of FIG. 1, FIGS. 3A and 3B show configurations of threshold matrices used in the present embodiment, FIG. 4 shows correspondence between an input pixel and the threshold matrices of FIGS. 3A and 3B, FIG. 5 shows a relation between coordinates and an output dot when an input pixel of FIG. 4 has a value 110, FIG. 6A shows a relation between the value of the input pixel of FIG. 4 and an output code C when the coordinates are (1, 1), FIG. 6B shows a relation between the code C of FIG. 6A and a dot pattern, FIG. 7A shows A content of data conversion in the encoder 2, FIG. 7B shows a content of data conversion in a decoder 4, FIG. 8 shows a dot pattern stored in a memory of an output device 5, and FIG. 9 shows another embodiment.

FIG. 1 shows a configuration of an image input/output system to which the image data processing apparatus of the present invention is applied. Numeral 1 denotes an image input device such as a reader which reads an image data and sends it out as an input image data sampled for each pixel, numeral 2 denotes an encoder (image data compressor) for encoding and compressing the input image data, numeral 3 denotes a transmitter for transmitting the data compressed by the encoder 2 or a memory for storing the compressed data, numeral 4 denotes a decoder for decompressing the compressed data supplied from the transmitter/memory 3, and numeral 5 denotes an image output device such as a CRT display or a printer which outputs the image data decompressed by the decoder 4. The printer may be a laser beam printer. The image data read by the input device 1 is compressed by the encoder 2 and the compressed data is transmitted or stored by the unit 3 and decoded by the decoder 4 to the data which complies with the output device 5. The output device 5 outputs the dot pattern in accordance with the data supplied from the decoder 4.

Figure 2:
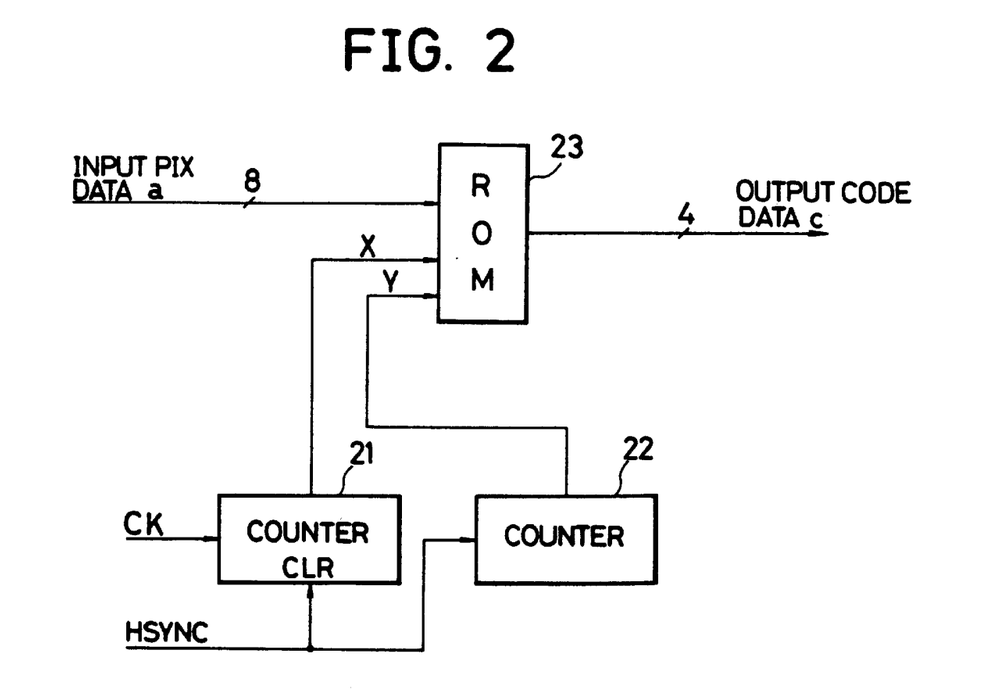

FIG. 2 shows a circuit configuration of the encoder 2 of FIG. 1. Numerals 21 and 22 denote counters and numeral 23 denotes a read-only memory (ROM).

In the present embodiments, an input image data a and outputs from the counters 21 and 22 are used as an address data to access the ROM 23 to read out a code data C (to be described later). For a sake of easy understanding, it is assumed that a threshold matrix is stored in the ROM 23. In a first step, the input image data is compared with the threshold matrix to produce a dot pattern. In a second step, the compressed code data C is obtained from the dot pattern. The counter 21 counts a pixel clock CK for inputting the image data to switch a threshold of the threshold matrix. It is reset by a horizontal synchronization signal $H_{SYNC}$. Similarly, the counter 22 counts the horizontal synchronization signal to switch the threshold of the threshold matrix. Accordingly, row and column coordinates in the threshold matrix are defined by the output signals of the counter 21 and 22.

(i) Step 1

Figure 3A:
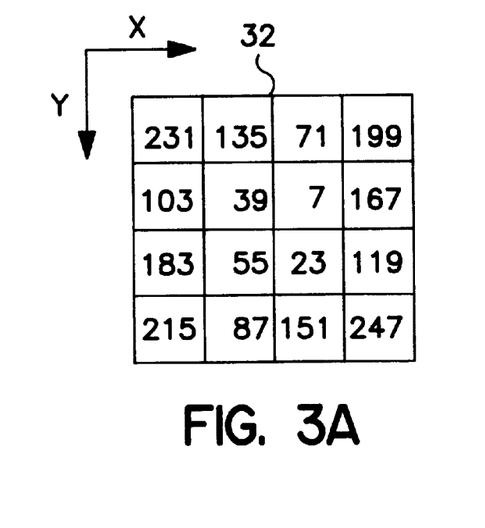
Figure 3B:
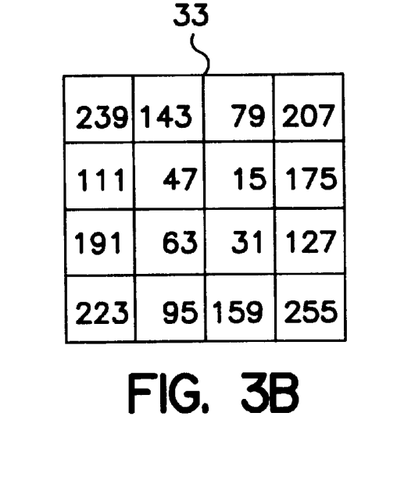

FIGS. 3A and 3B show examples of the threshold matrices stored in the ROM 23. In the present embodiment, the input image data is ternarized by a pair of threshold matrices 32 and 33. An arrow X indicates a horizontal coordinate in the matrix and an arrow Y indicates a vertical coordinate in the matrix. Thus, the thresholds of the threshold matrices 32 and 33 are represented by $T_1(x, y)$ and $T_2(x, y)$, respectively.

Figure 4:
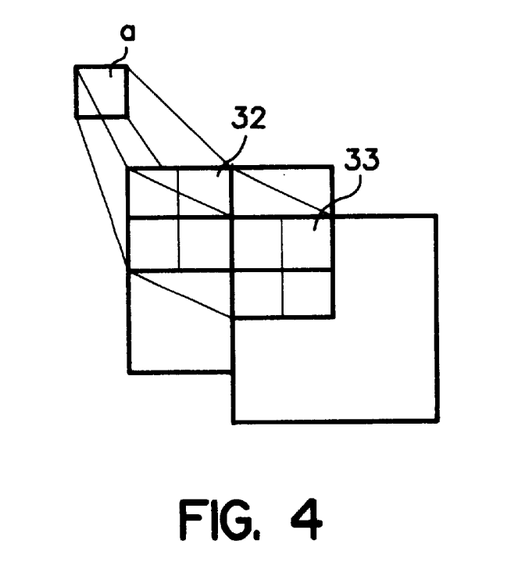

FIG. 4 shows a correspondence between the input image data a of FIG. 2 and the threshold matrices 32 and 33 of FIG. 3. As shown in FIG. 4, the 8-bit input image data a is compared with four thresholds $T_1(x, y)$ and $T_2(x, Y)$ (where x and y are coodinates in the matrix) corresponding to the threshold matrices 32 and 33, and it is converted to an output b=2 if $a \geq T_1(x, y)$ and $a \geq T_2(x, y)$, to an output b=1 if $T_1(x, y) \geq a > T_2(x, y)$ or $T_2(x, y) \geq a > T_1(x, y)$, and to an output b=0 if $a < T_1(x, y)$ and $a < T_2(x, y)$. The output b=0 represents non-dotting, the output b=1 represents dotting with a one-half density and the output b=2 represents dotting with a full density. In the present embodiment, the half density can be attained by a pulse width modulation.

Figure 5:
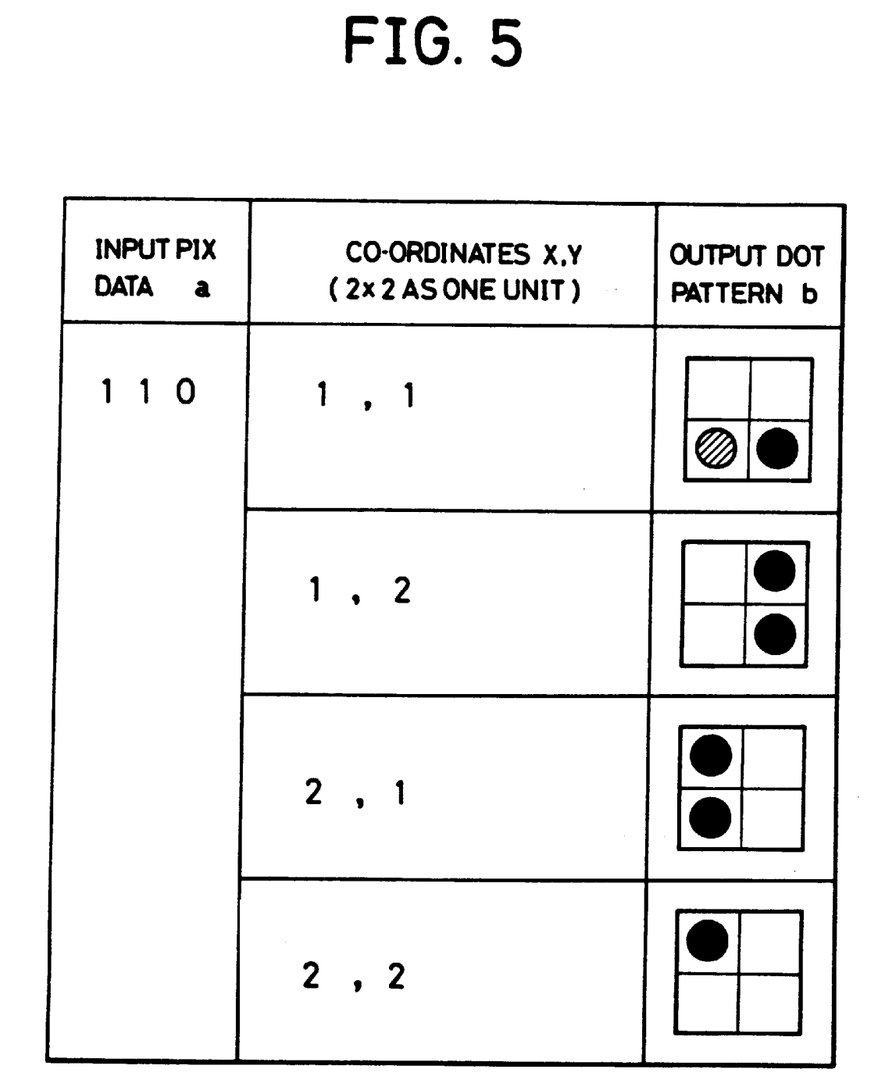

FIG. 5 shows a relation between the coordinates of the threshold matrices 32 and 33 and an output b when the input pixel data a of FIG. 4 is "110". The coordinate column indicates coordinates (x, y) with 2×2=4 pixels being one unit. For example, coordinate (1, 1) indicate coordinates of four thresholds of the left-top corners of the threshold matrices 32 and 33, and coordinates (1, 2) indicate coordinates of four thresholds of the left-bottom corners of the threshold matrices 32 and 33 (see FIGS. 3A and 3B). The coordinates (x, y) are switched by the counter 21 or the counter 22. As the counter 21 is incremented by one, the coordinate x is switched alternately. Similarly, as the counter 22 is incremented by one, the coordinate y is switched alternately. As shown in FIGS. 3A and 3B, at the left-top pixel of the coordinates (1, 1), $T_1$=231 and $T_2$=239. Accordingly, $a<T_1<T_2$ and the output b is "0" (non-dotting). Similarly, at the left-bottom pixel of the coordinates (1, 1), $T_1(=103)<a(=110)<T_2(=111)$ and the output b is "1" (hatched circle), at the right-top pixel, $a(=110)<T_1(=135)<T_2(=143)$ and the output b is "0" (non-dotting), and at the right-bottom pixel, $a(=110)>T_1(=39)$ and $a(=110)>T_2(=47)$ and the output b is "2" (black dot). In a similar manner, dot patterns shown in the output column are obtained.

(ii) Step 2

Figure 6A:
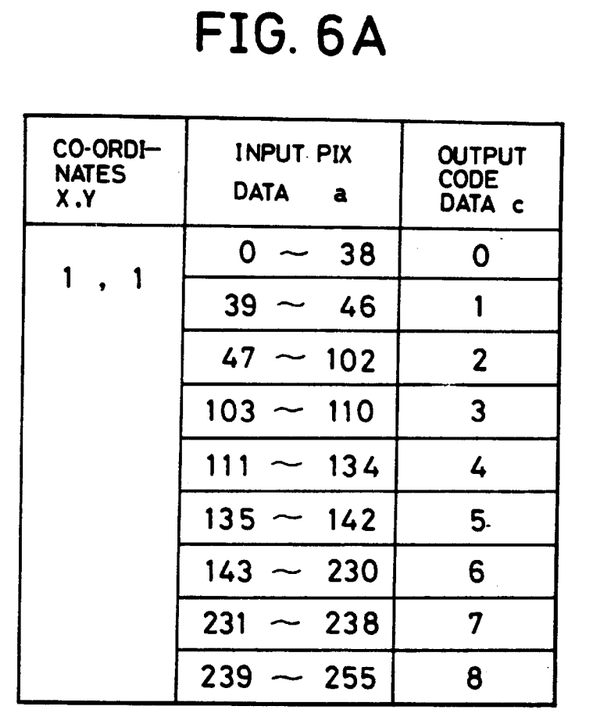
Figure 6B:
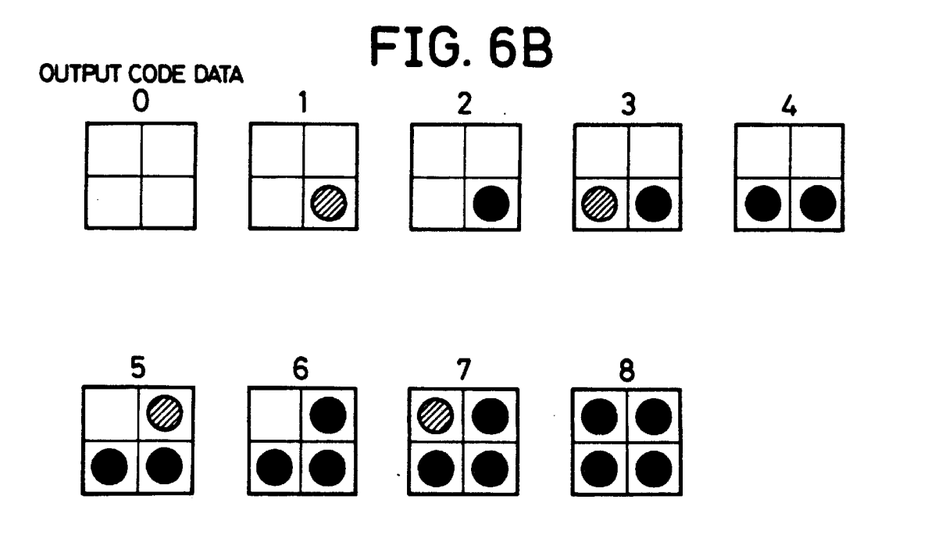

FIGS. 6A and 6B show relations between the value a of the input coordinate data 31 of FIG. 4 and the output code C when the x coordinate is 1 and the y coordinate is 1. FIG. 6B shows a relation between the dot patterns shown in the output column of FIG. 5 and the output codes C. For example, when the input value a is 110, the output code C is 3.

Figure 7A:
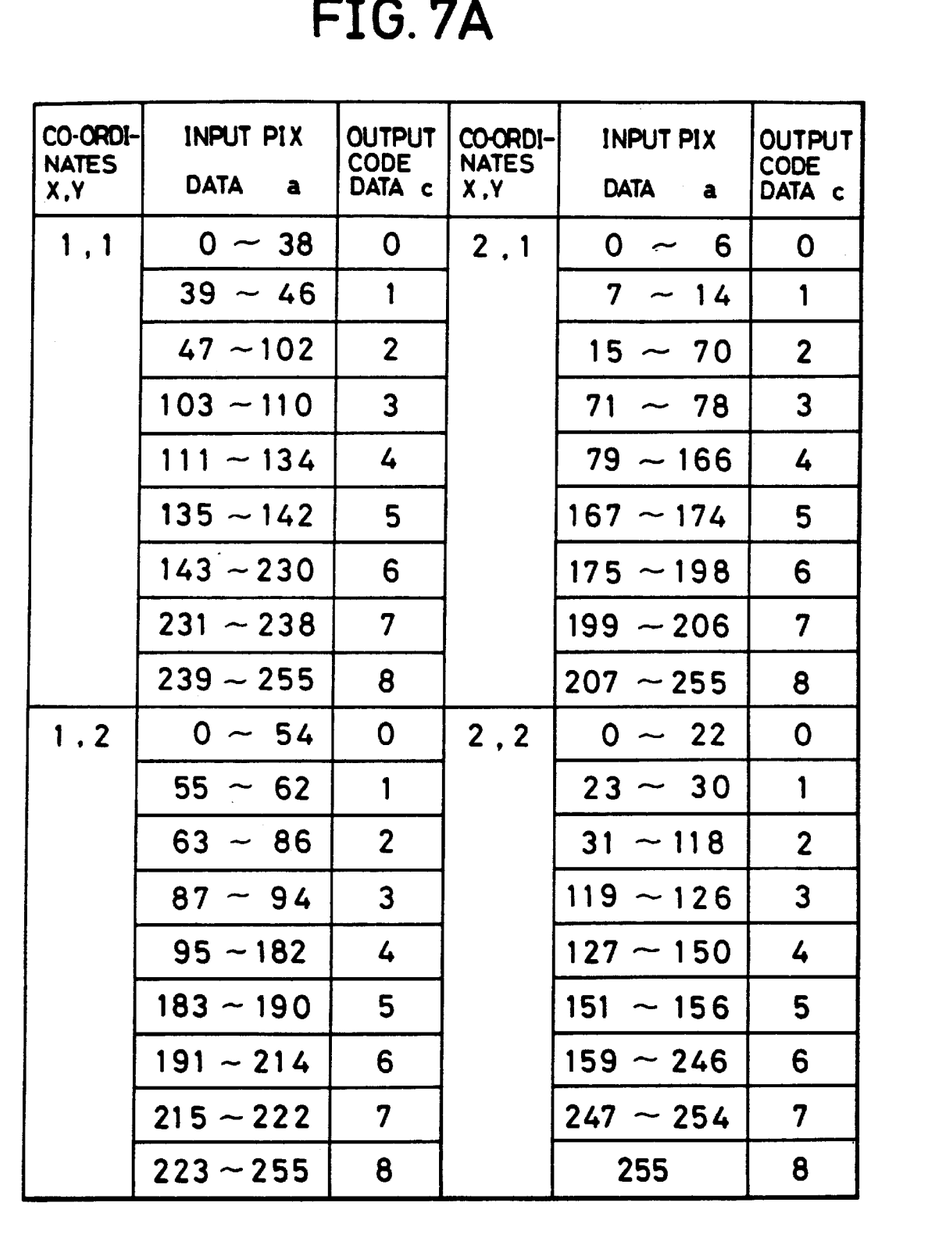

FIG. 7A shows a relation between the input pixel data a of FIG. 4 and the output code C at all points of the coordinates. For example, the value of the output code C at the coordinates (x, y)=(1, 1) indicates the dot pattern of FIG. 6B. As seen from FIG. 7A, for a given input image data a, the output code C differs as the coordinates (x, y) change. For example, when the image data a is 110, the output code C is 3 at the coordinates (1, 1), and it is 4 at the coordinates (2, 1). This is due to the fact that the values of the threshold matrices shown in FIGS. 3A and 3B vary from coordinates to coordinates.

In this manner, the 8-bit input pixel data a supplied from the input device 1 is applied to the encoder 2 and converted to the ternary dot output b in accordance with the thresholds in the threshold matrices 32 and 33 corresponding to the input pixel data a, and further converted to the 4-bit code data C as shown in FIG. 7A in accordance with the 4-pixel dot pattern of the dot output b. Accordingly, the data is compressed to one half of the data quantity required by the prior art apparatus, when the data is stored or transmitted.

Since the table such as the ROM 23 is actually used as described above, the coordinate position signal which is the output from the counters 21 and 22 and the 8-bit input image data (input pixel data) from the input device 1 are supplied to the ROM 23 as the address data, and the 4-bit code C is read from the ROM 23 as the compressed image data.

Accordingly, the same steps as the steps 1 and 2 described above are eventually carried out.

The 4-bit code data C supplied from the encoder 2 to the memory/transmitter 3 is applied to the decoder 4 through the unit 3. In the decoder 4, the code data C is decoded to an 8-bit signal a' in accordance with the coordinates and the decoded signal is supplied to the output device 5.

The decoder 4 has the counters and the memory (table) shown in FIG. 2. It switches the coordinates each time when the code data C is inputted, to produce the signal a'. The output device 5 ternarize the output signal a' by the threshold matrices 31 and 32 to assure complete decoding.

The output device 5 has a memory which stores the dot patterns and a counter for switching the coordinates, and outputs the dot pattern in accordance with the signal a' and the coordinates when the signal a' is inputted. Since the output signal a' applied to the output device 5 is an average of the input signals a, the tonality can be well reproduced even by an output device having a slightly different threshold matrix.

Figure 8:
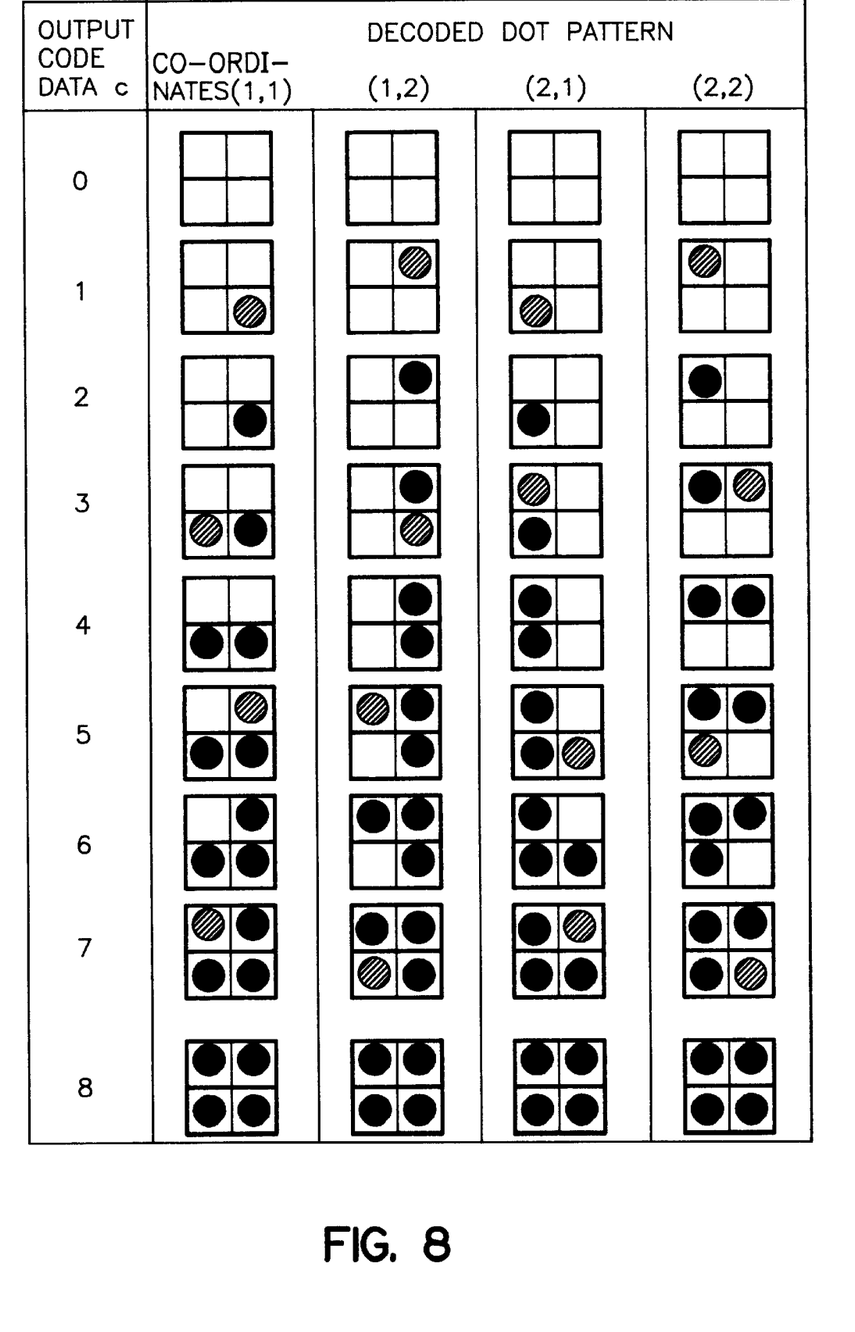

In the present embodiment, the 4-bot code C is decoded to the 8-bit pixel data a' by the decoder 4 because it is assumed that the output device 5 handles the 8-bit input signal. If the output device 5 can handle the 4-bit dot pattern, the decoder 4 may not be necessary. In this case, the output device 5 may have a memory which stores the dot patterns shown in FIG. 8 and a counter for switching the coordinates. The output device 5 selects the dot pattern in accordance with the code data C and the coordinates when the code data C is inputted. The memory may be a ROM, and the code data C and the output of the counter are used as the address data to access the ROM to output the dot pattern.

Since the output device selects the dot pattern in accordance with the code data C and the coordinates when the code data C is inputted, the image can be reproduced with the number of tone levels larger than that obtainable by four bits although the transmitted code data C is the 4-bit data.

Thus, in the present embodiment, the image data quantity to be transmitted, stored, recorded or displayed can be readily reduced with a very simple circuit configuration.

In the present embodiment, the input pixel data is compared with the 2×2 elements of the 4×4 threshold matrix, taking a balance between the resolution power of the input device and the resolution power of the output device into consideration. In the present embodiment, since the resolution power of the output device is higher than that of the input device, each pixel of the input image data is compared with the multi-elements of the threshold matrix to assure the reproduction of the image with high resolution and high tonality.

Figure 9:
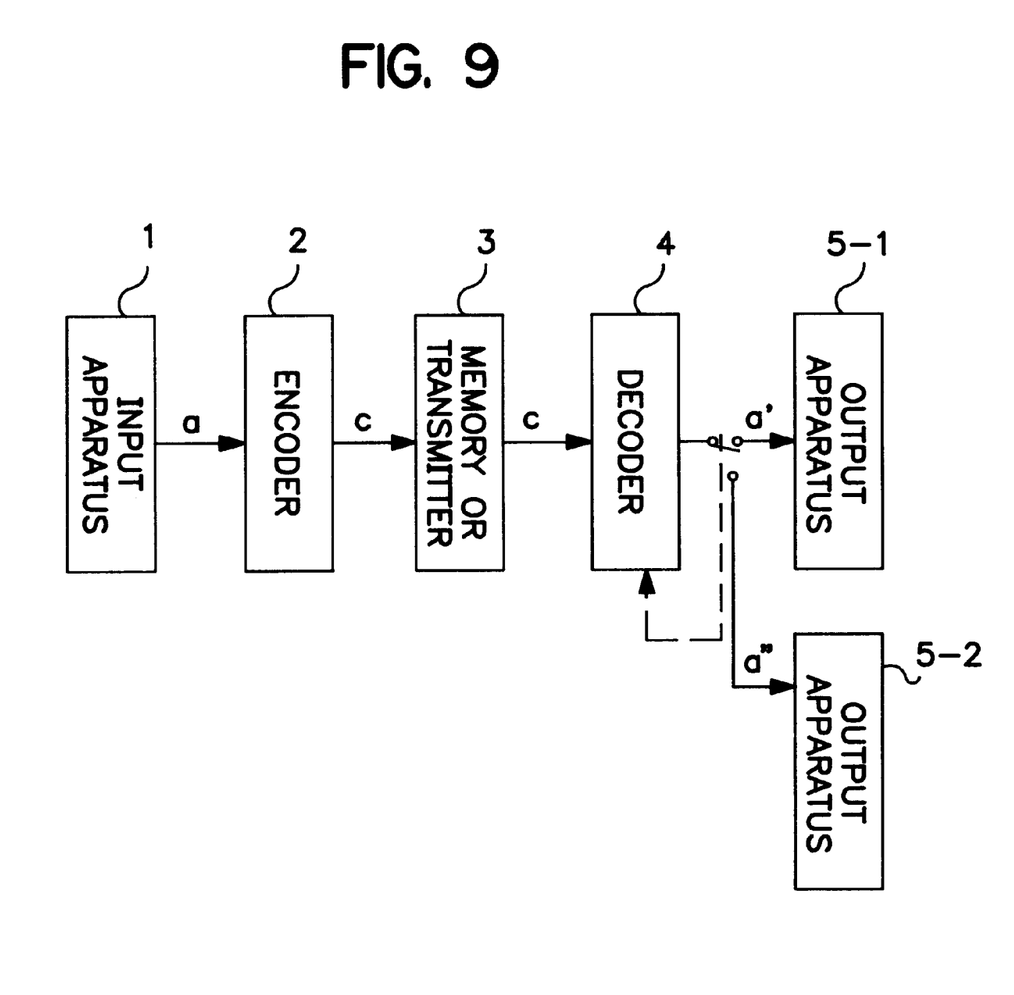

FIG. 9 shows another embodiment, in which when output devices are selected, the ROM in the decoder 4 is switched in response to the selection so that it produces an output a" for a second output device 5-2. Thus, a high quality of reproduced image is obtained with the different output device.

As described above, according to the present invention, the data can be readily compressed by using the code representing the dot pattern. Further, since the input pixel data is compressed and the compressed data is transmitted to the output device or stored in the memory, the communication line can be saved or the memory capacity can be reduced. The present invention is, therefore, particularly effective in a facsimile machine.

Further, since the present system does not use a difference between the data or serial numbers as opposed to the prior art method, the image can be moved with the compressed data without decoding. In this case, however, the distance of the movement of the image is an integer multiple of a size of the threshold matrix to prevent the destroy of the threshold pattern, but this is practically acceptable because the image can be moved at a pitch of 0.8 mm or 0.4 mm since an ordinary output device has a pixel density of approximately 0.1 mm per pixel and the threshold matrix of 8×8 or 4×4 size.

The present invention is not limited to the illustrated embodiments but many variations and modifications can be made within a scope of the claim.

What I claim is:

1. An image processing method comprising the steps of:
   selecting one output device from a plurality of different types of output devices, at least two of the types of output devices having respectively different tonality characteristics on multi-level data, wherein each of the multi-level data is represented by a plurality of bits;
   selecting, from a plurality of conversion tables stored in advance, a conversion table which is used for converting multi-level data and that corresponds to the type of the selected output device;
   converting values of input multi-level data represented by a plurality of bits into corresponding values of output multi-level data represented by a plurality of bits using the selected conversion table, the selected conversion table causing the output multi-level data to be reproducible by the selected output device as an image of high tonality; and
   outputting the output multi-level data to the selected output device to be reproduced as the image of high tonality.

2. A method according to claim 1, wherein said multi-level data is coded image data.

3. A method according to claim 1, wherein the selected conversion table is stored in advance in a ROM.

4. A method according to claim 1, wherein the selected conversion table stores data on a relationship between multi-level data and a dot pattern.

5. A method according to claim 1, wherein one of the output devices is a laser beam printer.

6. A method according to claim 1, wherein one of the output devices is a display.

7. A method according to claim 1, wherein said reproduction characteristic depends on a resolution of the selected output device.

8. An image processing apparatus connected to a plurality of different types of output devices, at two of the types of output devices having respectively different tonality characteristics on multi-level data, wherein each of the multi-level data is represented by a plurality of bits, said apparatus comprising:
   first means for selecting one of the output devices from the plurality of different types of output devices;
   second means for selecting, from a plurality of conversion tables stored in advance, a conversion table which is used for converting multi-level data and that corresponds to the type of the selected output device;
   means for converting values of input multi-level data represented by a plurality of bits into corresponding values of output multi-level data represented by a plurality of bits using the selected conversion table, the selected conversion table causing the output multi-level data to be reproducible by the selected output device as an image of high tonality; and
   means for outputting the output multi-level data to the selected output device to be reproduced as the image of high tonality.

* * * * *

UNITED STATES PATENT AND TRADEMARK OFFICE
CERTIFICATE OF CORRECTION

PATENT NO. : 6,072,906
DATED : June 6, 2000
INVENTOR(S) : Hiroaki Sato

Figure 7B:
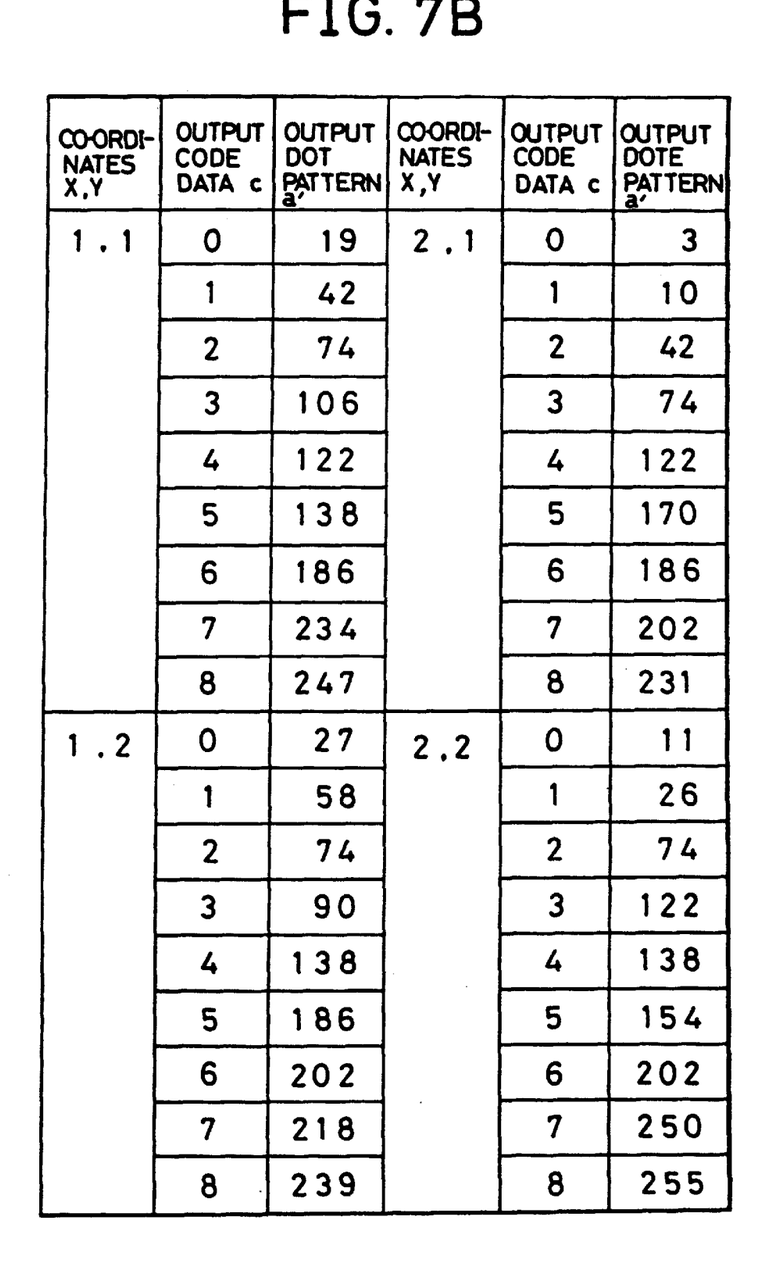

It is certified that error appears in the above-identified patent and that said Letters Patent is hereby corrected as shown below:

Sheet 6
Figure 7B, "DOTE" should read --DOT--.

Column 1
Line 6, "a" should read --which is a --.
Line 66, " input (output" should read --input/output--.

Column 3
Line 9, "$T_2(x, Y)$" should read --$T_2(x, y)$--.

Column 4
Line 19, "ternarize" should read --ternarized-.
Line 29, "4-bot" should read --4-bit--.

Column 5

Line 11, "destroy" should read --destruction--.
Line 19, "a" should read --the--; and "claim." should read --claims.--.

Signed and Sealed this

Twelfth Day of June, 2001

*Attest:*

NICHOLAS P. GODICI

*Attesting Officer*     *Acting Director of the United States Patent and Trademark Office*